United States Patent Office 3,350,194
Patented Oct. 31, 1967

3,350,194
NORBORNYL-1,1-DIMETHYL UREAS AND
THIOUREAS AND USE AS HERBICIDES
George A. Buntin, Wilmington, Del., assignor to Hercules
Incorporated, a corporation of Delaware
No Drawing. Filed Dec. 2, 1964, Ser. No. 415,476
11 Claims. (Cl. 71—119)

This invention relates to new compositions of matter. More particularly, it relates to compositions for controlling growth of undesired plants and to methods of utilizing such compositions.

Herbicidally active compositions of the present invention are represented by the structural formula

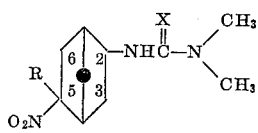

in which the R substituent on the norbornyl ring represents hydrogen or a lower alkyl, i.e., an alkyl group containing 1–4 C atoms, and X represents oxygen or sulfur. The compounds of this invention are all characterized by having a gem disubstituted norbornyl ring attached directly to a substituted urea or thiourea grouping.

The compounds of the present invention having this norbornyl ring in the molecule are prepared by the following general reactions.

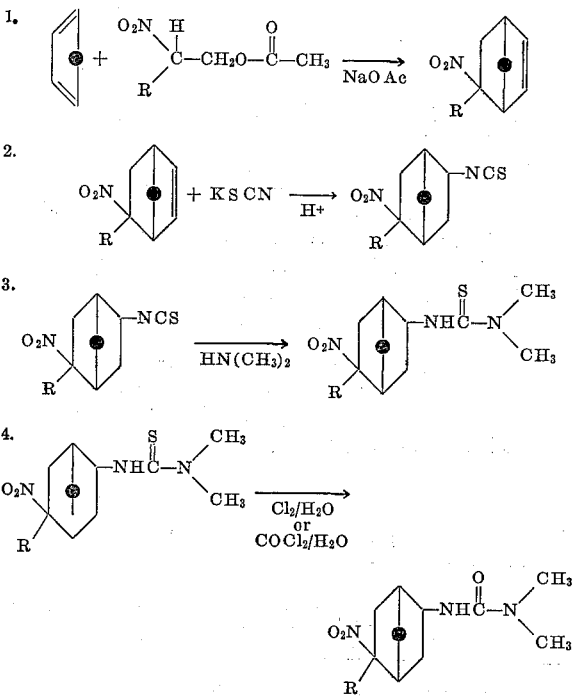

The following compounds are illustrative of the herbicidally active compounds of this invention.

No: Compound
(1)_____ 1,1 - dimethyl-3-(5-nitro-5-ethylnorbornyl) urea.
(2)_____ 1,1-dimethyl-3-(5-nitronorbornyl) urea.
(3)_____ 1,1 - dimethyl-3-(5-nitro-5-ethylnorbornyl) thiourea.
(4)_____ 1,1-dimethyl-3-(5-nitronorbornyl) thiourea.

The following preparations are illustrative of the various methods of preparing the compounds of this invention. All parts and percentages are by weight.

*5-nitro-5-ethylnorbornene.*—A solution of 83 parts of cyclopentadiene, 53 parts of sodium acetate and 100 parts of 2-nitrobutyl acetate in 528 parts of 95% ethanol was stirred at 50–60° C. for 15 hours. The mixture was then cooled to 0–5° C., and a solution of 25 parts of NaOH in 120 parts of water was added, after which the mixture was allowed to stand overnight at ambient temperature. Thereafter, about 394 parts of ethanol was removed by distillation. The residue was diluted with ether and water, and the resultant layers separated. The water layer was then extracted twice with ether, following which all of the ether extracts were combined, dried over $Na_2SO_4$ and distilled. A fraction of 66.7 parts of yellow liquid was collected at 130–132° C. at 40 mm. pressure. It had a refractive index at 20° C. of 1,4869 and analyzed 8.46% N compared to a calculated value of 8.48% N.

*5-nitro-5-ethylnorbornylisothiocyanate.*—To a slurry of 65 parts of 5-nitro-5-ethylnorbornene and 55 parts of KSCN in 88 parts of benzene was added slowly with stirring at 40° C. a solution of 45 parts of concentrated $H_2SO_4$ in 13 parts of water. The mixture was stirred at 35–40° C. for 6 hours and permitted to stand overnight. The mixture was then filtered, and the filter cake was washed with benzene. The filtrate and washes were combined, washed with water, and dried. Following this, benzene was removed by vacuum distillation, leaving 66 parts of red liquid. The red liquid was then stripped at 1.5 mm. pressure up to 73° C. to remove unreacted 5-nitro-5-ethylnorbornene. Thirty-five parts of dark liquid remained which analyzed 6.7% S, or 48% pure isothiocyanate, compared to the calculated value of 14.1% S.

*1,1-dimethyl-3-(5-nitro-5-ethylnorbornyl) thiourea.*—A solution of 19.8 parts of the above impure isothiocyanate in 33 parts of hexane and 44 parts of benzene at 5° C. was saturated with gaseous dimethylamine. The precipitate which formed was removed by filtration, washed with hexane and dried. The cream-colored powder which was obtained, amounting to 3.7 parts, melted at 170–173° C. and analyzed 14.4% N compared to a calculated value of 15.4% N for the thiourea

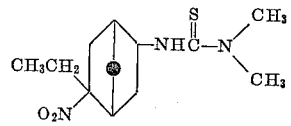

*1,1 - dimethyl - 3-(5-nitro-5-ethylnorbornyl) urea.*—To 24.5 parts of 1,1-dimethyl-3-(5-nitro-5-ethylnorbornyl) thiourea, prepared in the above manner, and 23.9 parts of concentrated HCl in 130 parts of water was added 40 parts of chlorine with stirring at 30–40° C. The clear solution which resulted was diluted with water neutralized with NaOH. The solid that separated was filtered off, washed with water, and dried. A quantity of white powder, amounting to 24.4 parts, was obtained which melted at 228–233° C. It analyzed 14.5% N compared to a calculated value of 16.4% N for urea

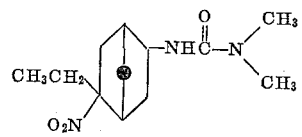

This material was recrystallized from a mixture of choloroform and ethyl acetate to yield 16.2 parts of white powder melting at 230–233° C. It analyzed 15.9% N.

*5-nitronorbornene.*—By the same procedure as that which was employed for the preparation of 5-nitro-5-ethylnorbornene, 125 parts of 2-nitroethyl acetate, 95 parts of anhydrous sodium acetate, and 150 parts of cyclopentadiene were reacted in 720 parts of 95% ethanol. A fraction of 51.5 parts of yellow liquid was collected at 60–65° C. at 1.5 mm. pressure. It had a refractive index of 1.4935 at 20° C. Gas chromatographic analysis indicated a purity in excess of 95% of 5-nitronorbornene.

*5-nitronorbornylisothiocyanate.*—A solution of 41 parts of concentrated $H_2SO_4$ in 11 parts of water was slowly added with stirring to 50.2 parts of 5-nitronorbornene and 50 parts of KSCN in 132 parts of benzene at 40° C. The reaction and work-up were as was previously described for the preparation of 5-nitro-5-ethylnorbornylisothiocyanate. After removing by distillation unreacted 5-nitronorbornene, 9.4 parts of viscous orange liquid remained as isothiocyanate. Thirty-nine parts of recovered unreacted 5-nitronorbornene was thereafter reacted with 50 parts of KSCN in 132 parts of benzene and 41 parts of concentrated $H_2SO_4$ in 11 parts of water, yielding 7.3 parts of product.

*1,1 - dimethyl - 3-(5-nitronorbornyl) thiourea.*—To 16 parts of 5-nitronorbornylisothiocyanate in a mixture of 33 parts of hexane and 17.6 parts of benzene at 10° C. was added sufficient gaseous dimethylamine to saturate the solution. The precipitate that formed was removed by filtration, washed with hexane, and dried. A quantity of 9.4 parts of buff-colored thiourea was obtained.

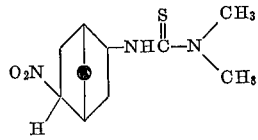

*1,1-dimethyl-3-(5-nitronorbornyl) urea.*—To 9.3 parts of the 1,1-dimethyl-3-(5-nitronorbornyl) thiourea in 88 parts of dry benzene and 72.3 parts of chloroform at 20–25° C. was added 20 parts of phosgene. The solution was stirred at up to 40° C. for one hour, cooled, diluted with water, and made basic with NaOH. The organic layer was separated, water washed, and dried. The solvents were then removed by evaporation in a stream of air, leaving a tan solid. The tan solid was recrystallized from ethyl acetate to yield 2.5 parts of buff-colored powder which melted at 173–176° C. and analyzed 17.9% N. The calculated value is 18.6% N for the structure.

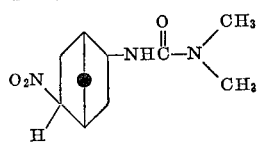

Herbicide examples

To test the compounds of this invention for activity as soil sterilants and as pre-emergence herbicides, aqueous suspensions containing 15 g. of active compound per liter of solution are first prepared. This is accomplished by dissolving the active compound in acetone to a concentration of 15 g. per 200 cc. acetone solution, adding "Tween 20" (a sorbitol monolaurate polyoxyethylene derivative) to a concentration of 10 g. per 200 cc. of the acetone solution, and diluting the acetone solution with water to bring the concentration to 15 g. of active compound per liter. Spraying such a solution at the rate of 80 gallons per acre, as is done in the Foliage Spray Test, will result in a test in which active compound is applied at the rate of 10 lb. per acre.

Application of smaller amounts of the active compound is accomplished by diluting proper volumes of the original solutions prepared as described above with the required amount of a diluent which comprises a solution of 20% acetone, 1% "Tween 20," and 79% water, all percentages being by volume. Thus, at an 80 gallon per acre rate of spraying; to apply one pound of active compound per acre, a liter of the spray solution should comprise 100 cc. of original solution and 900 cc. of diluent; to apply five pounds of active compound per acre, a liter of the spray solution should comprise 500 cc. of original solution and 500 cc. of diluent.

The rate of spraying for the Soil Germination Tests is 160 gallons per acre, accomplished by spraying twice at 80 gallons per acre per pass. Therefore, except where it is desired to apply 20 pounds of the active compound to each acre, the above-mentioned original solutions must be diluted for the Soil Germination Tests in the same way that they are diluted for use in the Foliage Spray Test. Thus, spraying at a 160 gallon per acre rate, to apply 0.5, 1, 2 and 10 pounds of active compound per acre, a liter of the spray solution should comprise 25 cc. of original solution and 975 cc. of diluent, 50 cc. of original solution and 950 cc. of diluent, 100 cc. of original solution and 900 cc. of diluent, and 500 cc. of original solution and 500 cc. of diluent, respectively.

The suspensions were sprayed on young growing plants for the Foliage Spray Test and on soil containing seeds which have been planted 24 hours earlier for the Soil Germination Tests. The plants and seeds used in these tests were as follows:

Common name:
- A. Millet _____ *Setaria sp.*
- B. Corn _____ *Zea mays*
- C. Curled mustard _____ *Brassica juncea*
- D. Cotton _____ *Gossypium hirsutum*
- E. Tomato _____ *Lycopersicum esculentum*
- F. Marigold _____ *Tagetes patula*
- G. Soybean _____ *Soja max*
- H. Buckwheat _____ *Fagopyrum esculentum*
- I. Sunflower _____ *Helianthus annuus*
- J. Wild oats _____ *Avena fatua*
- K. Peas _____ *Pisum sativum*
- L. Cucumber _____ *Cumcumis sativus*
- M. Red kidney bean ___ *Phaseolus vulgaris*
- N. Onion _____ *Allium cepa*
- O. Alfalfa _____ *Medicago sativa*
- P. Sugar beet _____ *Beta vulgaris*
- Q. Crab grass _____ *Digitaria sp.*
- R. Pig weed _____ *Amaranthus retroflexus*
- S. Carrot _____ *Daucus carota*
- T. Fox tail _____ *Setaria lutescens*
- U. Flax _____ *Linum usitatissimum*
- V. Wild mustard _____ *Brassica arvensis*

In the tabulations below are given results for exemplary tests. The numerical values are based on a 0–10 rating scale in which 0 means no damage to the plants and 10 indicates complete kill of the plants.

FOLIAGE SPRAY TEST

| | Rate, lb./acre | Compound Number | | |
|---|---|---|---|---|
| | | 1 | 2 | 3 |
| Millet | 1 | 10 | | 8 |
| | 5 | | | 9 |
| | 10 | 10 | | |
| Corn | 1 | 5 | 2 | 3 |
| | 5 | | 2 | 5 |
| | 10 | 10 | | |
| Mustard | 1 | 10 | 10 | 9 |
| | 5 | | 10 | 10 |
| | 10 | 10 | | |
| Cotton | 1 | 9+ | 6 | 9 |
| | 5 | | 8 | 10 |
| | 10 | 10 | | |
| Tomato | 1 | 10 | 10 | 9+ |
| | 5 | | 10 | 10 |
| | 10 | 10 | | |
| Marigold | 1 | 10 | 9 | 8 |
| | 5 | | 10 | 10 |
| | 10 | 10 | | |

When evaluated in the above test, Compound No. 4 shows activity of the same type as that of Compound No. 2, but the former is not quite as active as the latter.

SOIL GERMINATION TEST I

|  | Rate, lb./acre | Compound Number | | |
|---|---|---|---|---|
|  |  | 1 | 2 | 3 |
| Millet | 2 | 9+ | 0 | 7 |
|  | 10 |  | 9 | 10 |
|  | 20 | 10 |  |  |
| Corn | 2 | 10 | 0 | 1 |
|  | 10 |  | 2 | 8 |
|  | 20 | 10 |  |  |
| Mustard | 2 | 10 | 9+ | 10 |
|  | 10 |  | 10 | 10 |
|  | 20 | 10 |  |  |
| Cotton | 2 | 8+ | 0 | 5 |
|  | 10 |  | 4 | 10 |
|  | 20 | 10 |  |  |

SOIL GERMINATION TEST II (COMPOUND NUMBER 1)

|  | Rate | | |
|---|---|---|---|
|  | 0.5 lb./acre | 1 lb./acre | 2 lb./acre |
| Cotton | 3 | 5 | 8+ |
| Soybean | 0 | 4 | 8+ |
| Buckwheat | 10 | 9+ | 10 |
| Sunflower | 3 | 5 | 10 |
| Wild Oat | 1 | 6 | 9 |
| Peas | 1 | 1+ | 7 |
| Cucumber | 1+ | 7+ | 9+ |
| Red Kidney Bean | 1 | 8 | 8+ |
| Tomato | 8 | 9+ | 10 |
| Onion | 5 | 10 | 9+ |
| Millet | 7+ | 10 | 10 |
| Mustard | 10 | 10 | 10 |
| Alfalfa | 10 | 10 | 10 |
| Sugar Beet | 10 | 10 | 10 |
| Crab Grass | 10 | 10 | 10 |
| Pig Weed | 10 | 10 | 10 |
| Carrot | 10 | 9 | 10 |
| Fox Tail | 9 | 10 | 10 |
| Flax | 2 | 6 | 9+ |
| Wild Mustard | 10 | 10 | 10 |

The data in the above tables show that the compounds of this invention are highly active herbicides which are effective against a wide spectrum of plant species. To be effective as soil sterilants, however, herbicides should possess not only a high degree of non-selective activity, but should retain such activity for relatively long periods of time to prevent reinfestation by undesired vegetation. That such persistence is an outstanding feature of the instant compounds is demonstrated by the fact that the compounds have remained herbicidally active for periods in excess of one year after application to the soil.

The compounds of this invention are used in compositions for use as herbicides in liquid or solid form. Solutions of the compounds, for example, may be used as liquids in solvents such as acetone, cyclohexanone, isophorone, isopropyl alcohol, N-methylpyrolidone, and xylene and applied directly to the soil in which plants normally grow, or to the plants themselves. The compounds in solid form or solutions thereof in any of the above-mentioned solvents may be admixed with water using a suitable emulsifying agent to form an aqueous emulsion or suspension which is used as the carrier of a herbicide composition. The solid compound or liquid compound with solvent may also be extended by admixing with a solid carrier to form granules or dusts which are used as the herbicidal compositions. The dusts may be further extended by mixing with water and surfactant. Granules and dusts may be made from any suitably sized solids, preferably those that are readily available and low in price, such as talc, attapulgite, natural clays, pyrophylite, diatomaceous earth, kaolin, aluminum and magnesium silicates, montmorillonite, and similar substances such as are used as carriers in the insecticide and herbicide art.

Dusts are commonly produced from a dust-forming material such as talc by blending the active ingredient with talc and further grinding the mixture of active compound and talc with more talc so as to form a fluid dust of particle size less than about 50 microns. Fuller's earth is often substituted, and the active ingredient is often applied by spraying an organic solvent solution of the active compound of concentration in the range of 10 to 50%, evaporating the solvent, and using the fuller's earth mixture as a concentrate for further blending in the field. Similarly, the clays are often used for the same purpose, and the concentrates are often used for producing suspensions in water which are readily sprayed over the area to be treated, in which case carboxymethylcellulose, methyl cellulose and other carbohydrate gums may be used to aid in maintaining the suspensions.

From the standpoint of ease of application and convenience in handling, an advantageous type of herbicidal composition for use in accordance with this invention is that which is in the form of granules. Clay granules, for example, may be used as the carrier material and a solvent solution or aqueous dispersion of the active ingredient may be sprayed on the granules to provide a coating of the active ingredient. It also is possible to coat the granules with a dust formulation and then spray with a sticking agent to insure retention of the coating during handling and application.

One of the preferred types of herbicidal compositions is that in which water is used as the major component and a compound of this invention is a minor component. The only drawback to this type of composition is that it is not as easily and conveniently applied to the soil as is a granular formulation. Nevertheless, such aqueous dispersions may be prepared in the field so as to have a content of 0.5 to 10% of the active compound by dispersing a concentrate made up from about 10 to about 90% active compound, about 0.5 to about 10% dispersing agent, and 0 to about 90% inert diluent. Dispersing agents which are useful in such concentrates are the well-known surface active agents of the anionic, cationic or nonionic type and include alkali metal (sodium or potassium) oleates and similar soaps, amine salts of long chain fatty acids (oleates), sulfonated petroleum oils, sulfonated acyclic hydrocarbons, sodium salts of lignin sulfonic acids, alkylnaphthalene sodium sulfonates, sodium lauryl sulfonate, disodium monolaurylphosphates, sorbital laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethyl ammonium bromide, and cetyl dimethylbenzylammonium chloride. The aqueous dispersions may thus be made from the compounds themselves, from the compounds dissolved in a water-soluble or water-insoluble solvent, or from wettable powders. Since, however, the compounds generally are of rather limited solubility in many solvents, aqueous dispersions made from wettable dusts are a preferred form for these herbicides.

The compositions of this invention may be employed as sprays, dusts, or granules, and may be applied either to the plants or to the soil in which the undesired plants normally grow. The treatment may be carried out by treatment before seeds sprout, after plant life has started, or by treatment of the locus or area where plant growth is anticipated in advance of its emergence.

The active ingredients of the composition are applied in an amount sufficient to exert the desired herbicidal action. This amount will vary with the time of treatment and with the stage of growth to which the undesired plants have progressed. Where complete sterilization of the soil is desired, sufficient material is used to kill the most resistant plants. For such sterilization where highly resistant plants are absent, applications as low as one pound per acre may be used. Where more highly resistant plants are in evidence, the rate of application may be extended to 40 pounds per acre. Applications in the range of from about 5 to about 20 pounds per acre are, however, preferred.

From the above data it will be appreciated that many variations in amounts of active compound to be used and in modes of application are possible and will be obvious to those skilled in the art. The detailed description is thus given only to indicate the scope of the invention and no unnecessary limitation should be inferred therefrom.

What I claim and desire to protect by Letters Patent is:

1. A compound represented by the formula

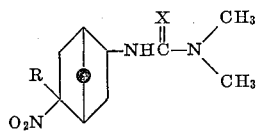

in which the R substituent on the norbornyl ring represents a substituent selected from the group consisting of hydrogen and lower alkyl and X is selected from the group consisting of oxygen and sulfur.

2.

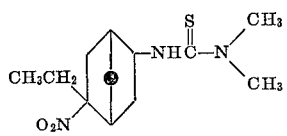

3.

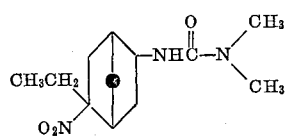

4.

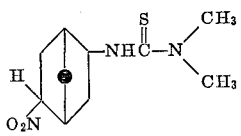

5.

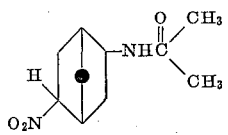

6. As a herbicidal composition, a compound of claim 1 in admixture with a major amount of a herbicidal carrier.

7. As a herbicidal composition, the compound of claim 3 in admixture with a major amount of a herbicidal carrier.

8. The method of controlling undesired plants which comprise contacting the soil in which said plants grow, prior to emergence of said plants, with a herbicidal amount of a compound of claim 1.

9. The method of controlling undesired plants which comprises contacting the soil in which said plants grow, prior to emergence of said plants, with a herbicidal amount of the compound of claim 3.

10. The method of killing plants which comprises contacting said plants with a toxic amount of a compound of claim 1.

11. The method of killing plants which comprises contacting said plants with a toxic amount of the compound of claim 3.

References Cited

UNITED STATES PATENTS 3,163,674 12/1964 Buntin _____ 260—553
3,174,843 3/1965 Buntin et al. _____ 71—2.6

HENRY R. JILES, *Primary Examiner.*